Dec. 31, 1929.  H. M. KELLOGG  1,741,942
FASTENING DEVICE
Filed April 9, 1928
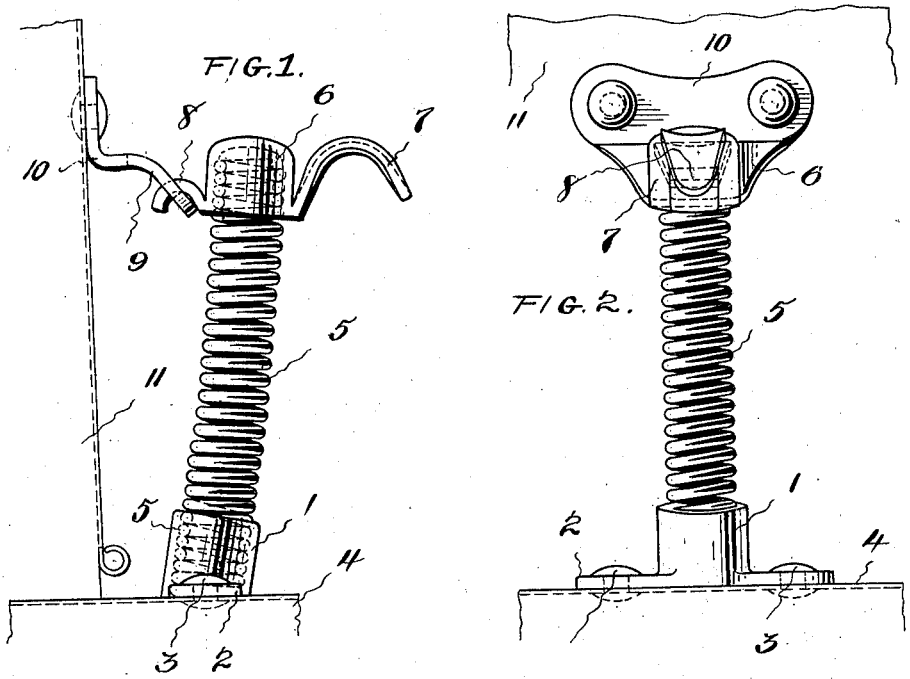
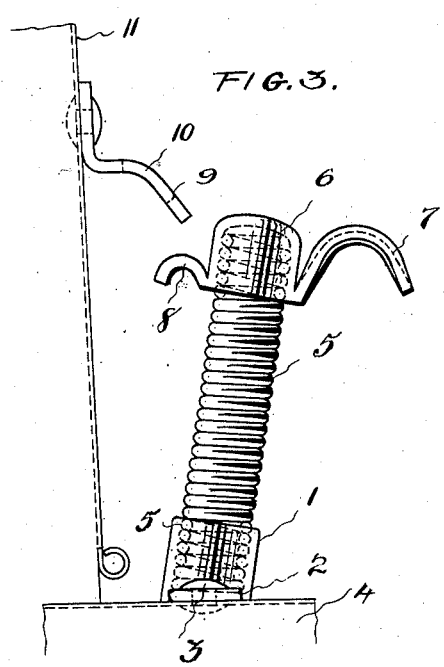
INVENTOR.
H. Morgan Kellogg
BY
ATTORNEY.

Patented Dec. 31, 1929

1,741,942

UNITED STATES PATENT OFFICE

HENRY MORGAN KELLOGG, OF MILFORD, CONNECTICUT

FASTENING DEVICE

Application filed April 9, 1928. Serial No. 268,403.

The present invention relates to fastening devices and is more particularly applicable for securing the hood of an automobile in its closed position. The object of the invention is to produce an efficient article at a comparatively low cost of manufacture and furthermore, the article is so constructed and arranged that its operation is simple and besides this, the article is of a flexible nature permitting it to readily adjust itself to uneven conditions.

Heretofore, various types of fastening devices for automobile hoods have been proposed and invariably the device is composed of a number of parts of which a barrel enclosing an operating spring and a plunger forms the essential part. This barrel is usually hinged to a sill or other stationary member of the automobile chassis. The barrel is generally provided with a head or a handle having a hook and which hook engages a bracket secured to the hood. Such fastening devices as previously proposed operate to engage and hold the hood closed when the spring is under compression.

According to the present invention, the barrel and plunger parts of the device are eliminated and the spring alone takes the place of the barrel and which spring is so arranged that the action of holding the hood down is effected when the spring is under tension. This spring provides a substantially flexible fastening device so that the same may be brought into various positions to easily engage the complementary part of the fastening means carried by the hood. The spring is connected with a socket or base secured to the sill or other member of the chassis and the free end of the spring carries a head or handle having a hook which engages the complementary fastening means on the hood. Furthermore, the spring is secured to both the base and the head by means of the coils of the spring engaging internal threads in the hollow base and head. The invention will be more fully described in detail with reference to the accompanying drawings wherein—

Figure 1 is a side elevation showing the improved device in its position for closing an automobile hood, for example;

Figure 2 is a front elevation of the device in a similar position and

Figure 3 is a side elevation showing the fastening means in its released position.

In the embodiment of the invention illustrated in said drawings, the improved fastening device is composed of three pieces only, one piece consisting of the base 1 which is preferably secured in a fixed and angular position as shown, by means of ears 2 which are fastened by rivets 3 to the sill plate or member 4. The improved device also includes a helical spring 5 preferably round, or another shape may be employed if desired and which spring is secured to the base by means of the coils thereof being engaged by screw threads on the base 1. The free end of said spring carries a head or handle member 6 and which member is provided at one side with a grip piece 7 and a hook 8 on the opposite side. This latter hook is adapted to be engaged within a hole 9 of the bracket 10 which latter member is secured to the hood 11.

In the operation of the improved device, to engage the hook 8 within the hole of the fastening means on the hood, the spring member of the device is extended against the tension thereof and when the force exerted to extend said spring member is released, the tension of the spring will firmly hold the hood in a tightly closed condition. It will be understood that a series of these fastening devices are employed as is now customary with other fastening devices for automobile hoods.

The improved fastening device hereinbefore described has a number of advantages which should be obvious and one advantage is the elimination of the numerous parts heretofore employed to form a fastening device of this kind. Another advantage of the improved fastening device is that the base thereof is rigidly secured, this being possible because of the flexible nature of the spring member for in lieu of hinging the fastening device as previously has been done, the resiliency of the device itself permits of its being brought into different positions so that the engagement of the hook with the hood fastening means may be easily effected. Furthermore, the device will stand in an angular position as shown in Figure 3 when the device is released. These advantages besides reducing the cost of manufacture of the device also facilitate the operation thereof both in fastening and unfastening the hood.

Various modifications may be made in carrying out the details of the invention hereinbefore described and it is to be understood that any modification coming fairly within the terms of the appended claims shall be covered thereby.

I claim—

1. A fastening device of the class described composed of a handle, a base, a coil spring connecting said base and handle, complementary fastening means on an automobile hood and said base being arranged in an angular position relatively to said hood.

2. An automobile hood fastening device comprising a base, a head, a coil spring connecting said base and head, said base and head being hollow and having internal threads engaging the coils of said spring.

3. A fastening device of the class described having a handle, a base, a helical spring connecting said base and handle and said handle and base having screw threads engaging the coils of said spring.

4. A flexible fastening means for an automobile hood, said means comprising a fixed base, a helical tension spring secured to said base by means of the coils thereof engaging screw threads on said base, a handle mounted on the free end of said spring and being likewise threaded and engaged by the coils of the spring and said handle having a hook member engaging complementary fastening means on said hood.

5. In combination with a hood catch, a base, a handle, a helical spring connecting said handle with said base, said spring when said hood catch is released being without tension or closed and resting in a relatively determined position and flexible in all directions lateral to said base.

Signed at Milford, county of New Haven, State of Connecticut this 4th day of April, 1928.

H. MORGAN KELLOGG.